May 8, 1962     R. A. CUSHMAN     3,033,131
MOLD AND MOLD BOARD CONSTRUCTION FOR CANDY MACHINES
Filed Sept. 8, 1958
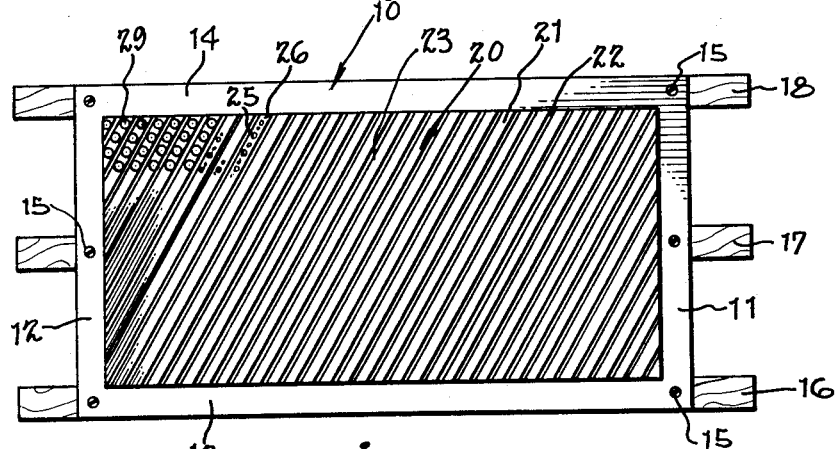
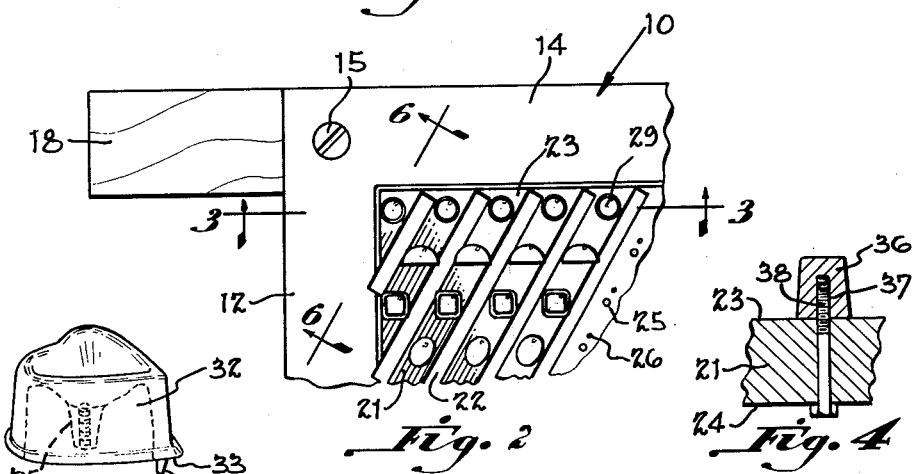
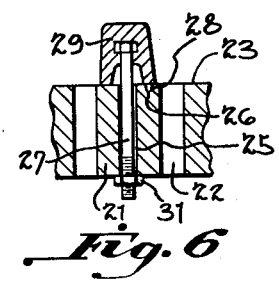
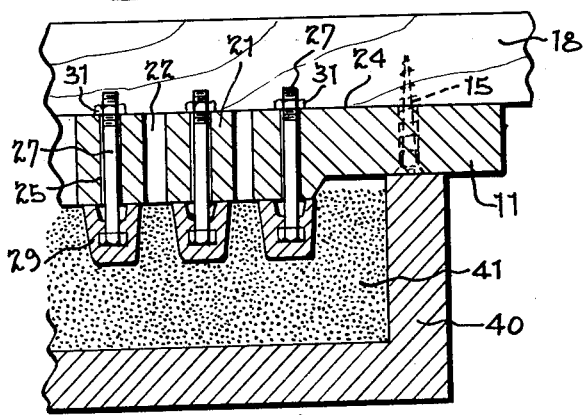
INVENTOR.
Ralph A. Cushman,
BY
Wood, Herron & Evans.
ATTORNEYS.

United States Patent Office 3,033,131
Patented May 8, 1962

3,033,131
MOLD AND MOLD BOARD CONSTRUCTION
FOR CANDY MACHINES
Ralph A. Cushman, Cincinnati, Ohio, assignor to Cushman Foundry, Inc., Cincinnati, Ohio, a corporation of Ohio
Filed Sept. 8, 1958, Ser. No. 759,659
2 Claims. (Cl. 107—3)

This invention relates to equipment used in candy making and is more particularly directed to a mold board and mold construction for forming depressions in a starch tray.

The principal object of the present invention is to provide an extremely durable mold board and molds adapted to provide improved starch molds free from defects frequently caused by use of mold boards of the prior art. It is believed that the signfiicance of this objective will be more readily comprehended from a brief description of the manner in which mold boards are used in the candy making process.

In the conventional commercial production of various types of candies, such as bonbons, a center, or core, is first formed in a machine and is subsequently chocolate coated by a second machine. The core making machine is adapted to receive a plurality of shallow trays which are filled to the brim with a fine particulate material such as starch. The machine further includes a movable platen or press member adapted to carry a mold board to which are secured a plurality of individual mold elements of the size and shape of the desired candy centers. In operation, the platen carries the mold board with the mold members projecting downwardly. As the platen frame is lowered, the mold elements are forced into the starch within the tray to form a plurality of cavities. After the cavities have been formed, the platen is raised to withdraw the molds from the starch. This starch mold is subsequently disposed beneath a depositor effective to deposit a quantity of confection in each of the cavities of the starch tray. In conventional production, the starch tray and formed candy centers are then dumped, and the candy centers are separated from the starch or other matrix material. In the final operation, the candy centers are coated with chocolate or a similar coating material and the starch is conditioned for reuse.

In the past, it has been conventional to provide mold boards comprising a plurality of metal or wood strips attached to a frame or a plurality of cross members. The strips in turn carry a plurality of mold or cavity forming elements which are secured to the strip by means of bolts or the like. Molds and mold boards of this type have been subject to several difficulties which have increased their cost and at times have seriously impaired the quality of candies produced. Specifically, one of the difficulties which has been caused by the use of prior art mold boards is that at times the core cavities have not been completely formed so that the resulting cores have been of irregular shape and size. I have determined that this difficulty is due to the fact that at times the starch tray is not completely filled with starch and that when the mold board is lowered into contact with the upper rim of the tray only the lowermost portion of the molds are pressed into the starch forming only very shallow cavities instead of the full depth cavities intended.

A second source of difficulty with prior art molds and mold boards is that when cores of a highly irregular shape such as heart shaped cores, for example, are being produced, the starch wall between adjacent cavities frequently crumbles causing adjacent cores to run together when the cavities are filled. This difficulty is, in turn, due to the fact that the individual molds secured to the mold board are not maintained in the same relative orientation; but rather during use some of the molds become loosened and tend to rotate in a random manner so that at times the projecting portions of adjacent molds are positioned closely adjacent to one another and either no starch wall is left between them or the starch wall is so thin that it crumbles and is ineffective to maintain a separation between adjacent cores when the confection is poured into the finished starch mold.

Another serious difficulty with prior art mold boards has been that the mold boards have had a relatively short service life, especially in high production plants. It has been found that wooden mold boards frequently warp or come apart after a few months of service.

The present invention is directed to a mold board and mold construction which overcomes these defects. More particularly, the present invention is predicated upon the concept of providing a one piece mold board comprising a unitary aluminum casting having a peripheral frame portion adapted to overlie and engage the upper rim of the starch box and an offset central portion comprising a plurality of strips separated by narrow slots, the lower surface of the strips being spaced downwardly from the surface of the peripheral frame.

The present invention further contemplates the provision of a plurality of spaced and aligned openings in the mold board for receiving support members such as threaded bolts for securing a plurality of individual mold members to the mold board. Each of these openings has associated therewith, in the same relative orientation, a small recess adapted to receive a lug formed on the individual mold member mounted over the adjacent opening. The lugs and recesses cooperate to maintain each of the individual mold members in the same predetermined orientation relative to one another so that starch walls of optimum thickness are maintained between the adjacent cavities in the starch molds. Moreover, in a mold board of the present invention, the entire individual molds are spaced slightly downwardly from the peripheral frame so that when that frame has been fully advanced into engagement with the starch box, each of the molds is fully pressed into the starch even though the starch does not quite fill the starch box. Consequently, the present mold and mold board facilitates the production of perfectly shaped cores.

A further advantage of the present mold board construction is that it is extremely durable and is adapted to withstand many years of continuous usage without warping or other deterioration.

These and other objects and advantages of the present invention will be more readily apparent from a consideration of the following detailed description of a preferred embodiment of the invention.

In the drawings:

FIGURE 1 is a bottom view of a mold board having a number of molds secured thereto.

FIGURE 2 is an enlarged sectional view of the corner of the mold board showing various forms of molds secured to the board.

FIGURE 3 is a cross sectional view taken along line 3—3, showing the mold board inverted in its normal operating position in connection with a starch tray.

FIGURE 4 is a cross sectional view showing a modified mold mounting means.

FIGURE 5 is a perspective view of a mold adapted for use with the present mold board.

FIGURE 6 is a cross sectional view taken along line 6—6 of FIGURE 2.

A preferred form of mold board constructed in accordance with the principles of the present invention is best shown in FIGURES 1 and 2. As is there shown, the mold board 10 comprises a unitary aluminum casting of generally rectangular external configuration. The mold board comprises a marginal frame including end sections 11 and 12 and side sections 13 and 14. This frame is provided with a plurality of openings for receiving screws 15 or the like for securing the frame to a plurality of cross bars 16, 17, and 18 by means of which the mold board is secured to the molding, or printing machine (not shown).

The mold board further comprises an offset center portion 20 provided with a plurality of diagonally extending spaced strips 21 separated by slots 22. The strips are integral with the frame, and are preferably formed together with slots 22 during the casting operation. These slots extend completely through the mold board from the bottom surface 23 to the top surface 24. Consequently, the slots are effective to provide an air vent to facilitate separation of the mold board from the starch tray.

Each of the strips 21 is provided with a plurality of equally spaced openings 25 and a like plurality of recesses 26. As is shown in FIGURE 6, each of the openings 25 is adapted to receive a pin-like mold supporting element such as a machine screw or bolt 27; while each of the recesses 26 is associated with an opening 25 and is adapted to receive a locating lug 28 formed integral with mold member 29. Openings 25 and recesses 26 can be cast into the mold board or can be machined after the board has been cast. It is to be understood that openings 25 and recesses 26 are formed in each of the strips 21; and that mold members are secured to each of the strips. Most of the recesses, openings and mold members have been omitted from FIGURE 1 for purposes of clarity. It will be appreciated that the disposition of the openings in strips 21 as shown in FIGURE 1 provides a staggered arrangement of molds in a transverse direction. Consequently, the starch trays produced by this mold board are particularly adapted to be filled by staggered pump bars. However, if desired, the molds need not be staggered in this manner. Moreover, if the mold board is to be used with other than a staggered pump bar, strips 21 and slots 22 can extend transversely of the mold board, parallel to ends 11 and 12 if desired.

Various forms of molds and mold attaching means can be used in conjunction with the present mold board. Preferred forms of molds are shown in FIGURES 5 and 6. As shown in FIGURE 6, mold member 29 comprises a solid casting having an external configuration of the desired form of core. The center of the casting is provided with a bolt which is inserted at time of casting and is of sufficient length to extend downwardly through an opening 25 formed in the mold board. The bottom surface 23 of mold member 29 is flat except for a downwardly projecting lug 28 which is adapted to reside in a recess 26 of the mold board.

In order to mount the mold member upon a mold board, bolt 27 secured to the mold member is inserted through an opening 25 and the mold member is rotated until lug 28 fits within a recess 26. Thereafter, a nut 31 is threaded over the opposite end of bolt 27 and is tightened to draw the mold member tightly against the board. The mold member is thus oriented, and its rotation is prevented by the cooperative engagement of lug 28 with recess 26.

A slightly modified form of mold member is shown in FIGURE 5. As is there shown, mold member 32 is in the form of a heart. The bottom surface 33 of the mold member is flat and is provided with an outwardly turned flange and a lug 34 similar to the lug on mold member 29. However, mold member 32 instead of being solid is in the form of a hollow shell provided with a central boss 35 having an opening adapted to be drilled and tapped to receive a machine screw (not shown).

A modified form of mold member and mounting means is shown in FIGURE 4. As there shown, mold member 36 is provided with an opening 37 for threadably engaging a machine screw 38 inserted in an opening 25 formed in one of the strips 21 of the mold board. While in the preferred embodiment, the mold members are cast aluminum, it is contemplated that such members can also be molded from suitable plastic material such as a rigid polyvinyl chloride.

FIGURE 3 illustrates the manner in which the present mold board is used to form impressions in a starch tray indicated generally at 40. If desired, a wire mesh screen (not shown) can be secured to the center section of the mold board. The screen is interposed between the mold members and the bottom surfaces of strips 21, and is held in place by straps or the like screwed to the frame area of the mold board. The tray 40 is filled substantially to the top with a particulate starch or other matrix material 41. In operation, when the starch tray is presented to the printer, its platen lowers the mold board until frame sections 11—13 engage the upper rim of tray 40. As is shown in FIGURE 3, the entire length of the mold members 29 is disposed within the tray due to the fact that center section 20 projects downwardly from the frame. Consequently, these mold members form complete impressions in the starch even though the starch is not absolutely level with the upper rim of tray 40.

Having described my invention, I claim:

1. A mold board comprising a unitary aluminum casting, said aluminum casting having a generally rectangular marginal frame portion and a central portion outwardly offset from the plane of said frame, said central portion including a plurality of parallel strips separated by parallel slots, said strips being provided with a plurality of spaced pin receiving openings and a like plurality of lug receiving recesses, each of said recesses being associated with an opening in predetermined orientation therewith.

2. Apparatus for molding starch trays, said apparatus including a mold board comprising a unitary aluminum casting, said aluminum casting having a generally rectangular marginal frame portion and a central portion outwardly offset from the plane of said frame, said central portion including a plurality of parallel strips separated by parallel slots, said strips being provided with a plurality of spaced pin receiving openings and a like plurality of lug receiving recesses, each of said recesses being associated with an opening in predetermined orientation therewith, and a plurality of mold members, each of said mold members having a pin bore formed therein and an indexing lug formed adjacent the bottom surface of said mold member, and a plurality of pins, each of said pins being in engagement with the bore in a mold member and an opening in said mold board, the bottom surface of each of said molds being in abutment with the surface of a strip, and the indexing lugs of each of said molds residing in a recess in one of said strips, whereby each of said mold members is held in a predetermined orientation relative to the other mold members.

References Cited in the file of this patent
UNITED STATES PATENTS

| 2,026,701 | Pearl | Jan. 7, 1936 |
| 2,818,822 | Greenberg | Jan. 7, 1958 |

FOREIGN PATENTS

| 9,006 | Great Britain | May 7, 1895 |
| 559,827 | France | June 23, 1923 |

OTHER REFERENCES

Modern Metals, May 1947, page 32.